United States Patent [19]

Sibley

[11] Patent Number: 4,553,200
[45] Date of Patent: Nov. 12, 1985

[54] MODULAR OUTPUT DRIVER FOR VITAL PROCESSOR SYSTEMS

[75] Inventor: Henry C. Sibley, Adams Basin, N.Y.

[73] Assignee: General Signal Corporation, Stamford, Conn.

[21] Appl. No.: 550,431

[22] Filed: Nov. 10, 1983

[51] Int. Cl.[4] .............................................. G06F 1/00
[52] U.S. Cl. ................................................... 364/200
[58] Field of Search ... 364/200 MS File, 900 MS File

[56] References Cited

U.S. PATENT DOCUMENTS 4,432,051 2/1984 Bogaert et al. ..................... 364/200
4,471,486 9/1984 Sibley .............................. 364/200 X Primary Examiner—Raulfe B. Zache
Attorney, Agent, or Firm—Pollock, Vande Sande & Priddy

[57] ABSTRACT

As a component in a vital processing system, the vital driver includes hardware and software elements that enable it to produce a time sensitive output in response to receipt, on a batch basis, of check words. The number, content and rate of the check words are checked and used by the vital driver to produce a time sensitive output which can have parameters such as carrier frequency, modulation rate and duty cycle which are determined in part by the number, content and rate of receipt of the check words, and in part by the flawless execution of its own software. The vital driver software includes a number of significant elements including a vital starting delay, as well as modular components for producing different portions of the time sensitive output. Because of its modular nature, the software allows the production of an identical time sensitive output from groups of check words which are different in number and content, enabling the same vital driver to perform a checking function on primary processors which are running significantly different software.

24 Claims, 16 Drawing Figures

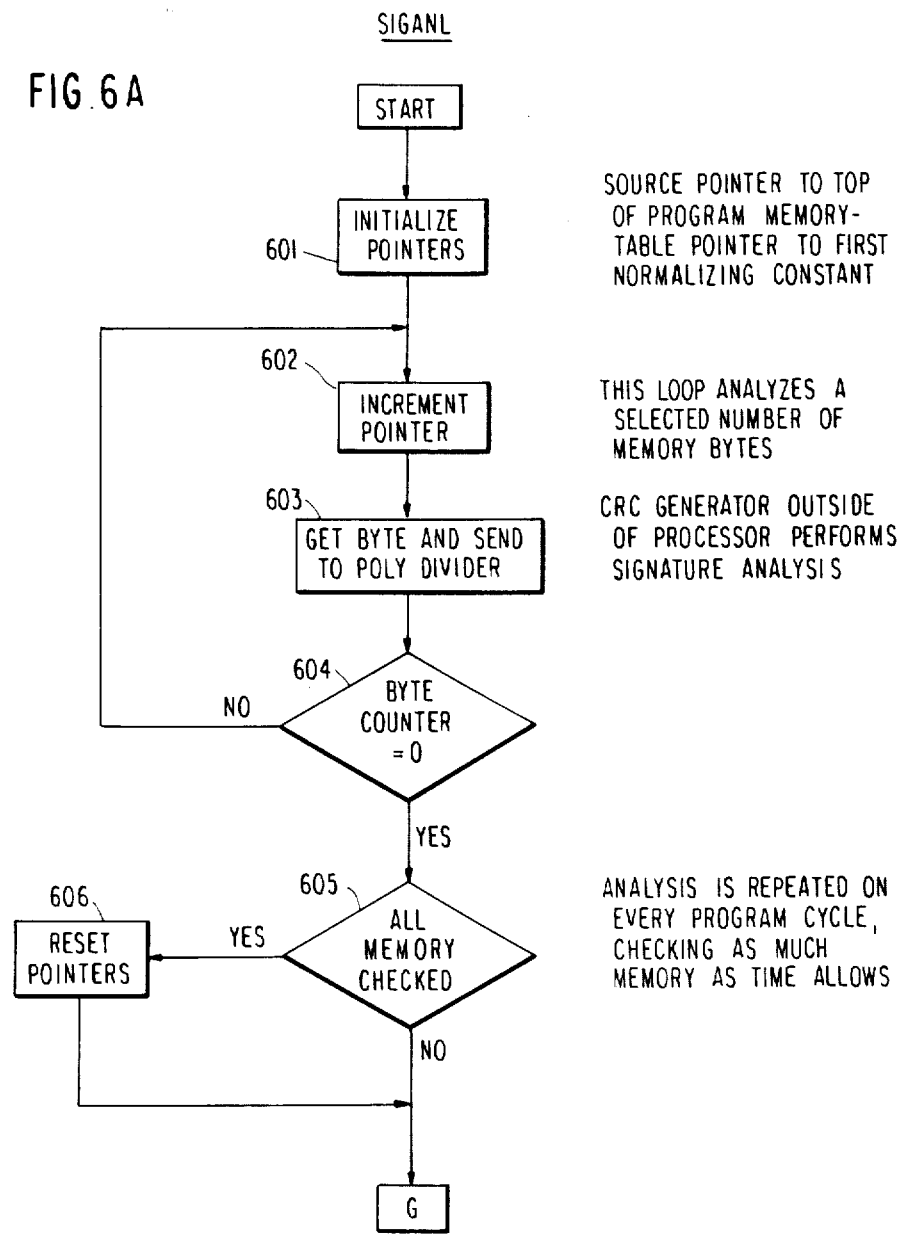

MODULAR OUTPUT DRIVER FOR VITAL PROCESSOR SYSTEMS

DESCRIPTION

1. Field of the Invention

The present invention relates to implementation of Safety Assurance Logic, for verifying the vital characteristic of the output of an independently operating processor.

2. Background Art

Check words, or check bits, have been used for quite some time in checking digital processor operations, see for example U.S. Pat. Nos. 4,368,532 and 4,107,253 to Imazeki and Borg, respectively. Whereas, the former patent is directed to deriving and storing check bits (e.g. parity bits), Borg uses check words. However, he tests the check words by comparing them to a stored pattern. This technique is subject to a number of criticisms, not the least of which is the use of a simple pulse to verify passage of a test. The simple pulse can be (spuriously) produced as a result of a large number of failure possibilities. Still other variations are shown by Sery (U.S. Pat. No. 4,358,849), Johnstone (U.S. Pat. No. 4,120,030), Pertl (U.S. Pat. No. 4,128,874) and Dodt (U.S. Pat. No. 4,251,885). These patents show a variety of techniques for checking processor operation, but in general fail to guard against a failure in the output of the check procedure itself.

Safety Assurance Logic is a designation by the assignee of this application of techniques and associated apparatus for assuring that a non-vital device, such as a conventional computer, a microprocessor or the like, is operating properly. This is considered important so that the output provided by the processor can be regarded as vital. In this regard, see Safety Assurance Logic—Using Microprocessors Vitally, presented at the Annual Meeting of the Association of American Railroads on Oct. 5, 1981, and Safety Assurance Logic—Microprocessors in Vital Systems, presented at the American Public Transit Associated Annual Rapid Transit Conference, Cleveland, Ohio, June 16, 1982, as well as my prior U.S. Pat. No. 4,181,849 and my copending applications Ser. No. 273,299, filed June 15, 1981 and Ser. No. 313,926, filed Oct. 22, 1981, both the applications and patent assigned to the assignee of this application.

In the above-referenced patent, a vital relay driver (including a digital processor) with a controlled response time is disclosed. The vital relay driver can produce an output signal of fixed and specified frequency, for example to maintain a relay energized, but can also manipulate that output signal to provide a controlled release time of the relay. Accordingly, the vital driver disclosed in the patent determines, not only that the relay should or should not be energized, but if the relay should be de-energized, the release time of the relay can be selectively predetermined. The above-referenced '299 application discloses a vital communications system for transmitting multiple messages. A vital driver is provided for validating the operations of an independently operating processor, which itself is performing a decoding function. In this and other systems (such as that of '926), a processor (the primary processor) is performing a primary function on its inputs to produce one or more outputs. To produce these outputs, the primary processor performs a sequence of steps dictated by a primary program. Inasmuch as the processors employed are typically conventional microprocessors, they are not in and of themselves vital. Rather, the processors are associated with a vital driver, the function of which is to test or check correct execution of the primary processor in performing its primary function. In order to effect this checking operation, the vital driver, itself another conventional microprocessor of non-vital characteristic, also performs a sequence of steps. The primary processor, in addition to performing its primary function via the sequence of steps, produces, at certain times in the sequence, one or more check words; the intent of the check words is that by their value (and perhaps by their number) they indicate the correct operation of the primary processor. Since the primary function performed by such primary processors can vary quite widely in complexity, those skilled in the art will understand that the time required for the primary processor to run through its sequence of steps will also vary quite widely. The time required for the primary processor to run through its sequence of steps for performing the primary function as well as for producing the associated check words, will be termed a basic cycle. At the conclusion of any basic cycle, results are manifested in two forms; output indications, indicative of values assigned by the primary processor to its different outputs, as well as a group of check words. The values assigned by the primary processor to the outputs are eventually destined for the outside world, i.e. to operate some physical device such as a relay, switch, signal, or the like. The check words, on the other hand, are destined for the vital driver. The vital driver's function is to operate on the check words and provide an enabling output, in the event that, insofar as the vital driver can determine, the check words indicate that the basic cycle has proceeded in such a fashion to indicate that the outputs are appropriate. The primary processors' outputs are gated to the outside word by the vital driver. In the absence of the enabling output, the actual output of the primary processor is prevented from being effective and instead the real world signals are set to their most restrictive condition, e.g. all signals are set to stop. Thus, it is only in the presence of the enabling output provided by the vital driver, that any more permissive output of the primary processor is available to the outside world.

The primary processor may, in the course of its primary function, not only perform the steps required to produce the required outputs, as well as producing the check words for the vital driver, but also includes tests of its output indications to verify the output indications actually reflect the values assigned to them by the primary processor. This check of the output indications is one factor which is used in the production of the check words. Thus, when the vital driver operates on the check words, it is not only checking on the proper functioning of the steps performed to effect the primary function, but it also has the responsibility for verifying that the output of the primary processor actually reflect the values intended to be assigned to those outputs by the primary processor.

A problem in implementing this checking becomes evident if the time required for the primary processor to perform the basic cycle is much longer than the time within which the output of the primary processor could fail.

For example, consider a basic cycle which requires one second to execute; namely the processing of the basic cycle cannot be checked any more often than once in every second. On the other hand, consider that the time within which the output of the primary processor must be checked is at least once every 300 milliseconds to ensure that it accurately reflects the value assigned to that output by the primary processor. It is at once apparent that there may be a requirement for more frequent checking, at least insofar as the output of the primary processor is concerned, than is possible if checking is only performed once each basic cycle.

In addition, because the Safety Assurance Logic must be applied to a wide variety of basic cycles, particularly those running the gamut from relatively simple to much more complex logic, it should also be apparent that the number of check words required to evidence the flawless execution of a basic cycle can also vary quite widely. For example, it is not at all out of the realm of possibility to consider that some basic cycles will produce 50 check words, whereas others will produce upwards of 1000 or more. In addition, the output of the vital driver should be distinctive, and of such a nature that it can only be produced as a result of a series of relatively improbable events, unless both the primary processor and the vital driver have both executed their programs without fault. In the case of the vital driver shown in U.S. Pat. No. 4,181,849, the output of the vital driver (the enabling output) was a signal at a specified frequency, which is made up by altering the output of a particular bit at the corresponding rate; importantly, there is no tuned circuit included in the apparatus capable of producing the specified frequency. However, producing a fixed frequency output made up of a sequence of states of a particular bit, when the data required to produce that output can vary from 50 to 1000 or more check words presents another problem. Part of the problem is the fact that processors typically do not operate in real time yet, in this case, the required output is time sensitive. Another part of the problem is the desire to have the enabling output of the vital driver be uniform. Thus, the problem relates to how a particular time-sensitive enabling output can be produced as a result of repetitive receipt of a group of check words, where, however, the number of words in the group must be variable within relatively wide limits.

SUMMARY OF THE INVENTION

The invention solves these and related problems in a manner to become clear hereinafter. More particularly, the invention provides sequences of steps for the vital driver which are modular in nature. Different sequences are called or invoked by different check words. To this end, a sequence of steps is provided by the invention to produce, from a one set of check words, a predetermined portion of the desired output, measured in time. Other sequences produce a portion of the desired output which depends on the value of a check word (or word pair). Still other sequences of steps are provided which consume little time (measured on the scale of the output signal) yet are required to link other sequences into an operative program. The sequences of steps which contribute relatively little to the output, yet are necessary for operation of those sequences which do, are provided so that check words in excess of those actually required to produce the output signal, can be adequately checked. Thus, by calling appropriate ones of the sequences in an appropriate order, a given output may be produced notwithstanding wide variation in the number of check words.

The primary processor and the vital driver are not synchronized. Thus, even assuming flawless operation of both processors, the point in the vital drivers operating sequence at which the basic cycle is concluded can vary. Unless this potential slippage is controlled somehow, the two processors can fall so far out of step as to produce a failure indication when no real failure has occurred. Thus, it is another object of the invention to slave the vital driver to the basic cycle of the primary processor to ensure that sufficiently rigid synchronization is maintained. To this end, at least one sequence is provided to merely mark time until additional check words are available.

Furthermore, to overcome the problem caused by the necessity to check the output of the primary processor at a rate faster than the basic cycle can be performed, the vital driver determines a sustain time based on the receipt of a correct set of main check words; the main set of check words being produced once per basic cycle and the sustain time is at least as long as required for execution of the basic cycle. While the vital driver, determines a sustain time, this is not a sufficient condition to provide the enabling output for the period of the sustain time. Rather, the enabling output will be produced only for the duration of the sustain time if, at more frequent intervals, additional sets of recheck check words are also provided. The recheck check words are provided at the rate necessary to check the output of the primary processor. Accordingly, while the presence of main check words conditionally makes the enabling output available for the total duration of the sustain time, nevertheless if the recheck check words are not provided at the more frequent rate (and with the correct content) required to check the output of the primary processor, the output of the vital driver departs from the format of the enabling output. For example, in one embodiment the main cycle was one second, a recheck rate was one recheck every 50 milliseconds.

In accordance with still other aspects of the invention, the vital driver has a small number of vital sustain time segments; yet all vital segments are required in every program regardless of the number of check words or the period of the enabling output.

From the foregoing it will be appreciated that many check words may be generated and provided to the vital driver in the course of a basic cycle. In order to ensure that the enabling output is not erroneously produced by re-using check words, the vital driver is required to destroy each check word when it is accessed; failure to destroy even a single check word prevents proper completion of the vital driver operating sequence.

Furthermore, in order to ensure that the check words are actually produced in the appropriate sequence, each check word as transmitted to the vital driver is actually different by an offset from what is required by the vital driver for proper operation. Furthermore, the offset value continually changes and as a result the check words must be accessed in their correct order or the vital driver will not perform the correct sequence of steps required for production of the enabling output.

In accordance with still further aspects of the invention, the vital driver has an associated timer. Each identifiable segment (for example the recheck time) of the enabling output is checked against a standard provided by the external timer.

In accordance with another aspect of the invention, the vital driver includes a counter, counting clock states of the processor included in the vital driver. Other identifiable segments of the enabling output (a modulation cycle) are checked against the state of the counter.

Furthermore, the vital driver program is arranged such that if program sequences are attempted to be executed out of the appropriate order, the vital driver is placed into a halt state. The halt state has two effects: importantly, it terminates production of the enabling output. In addition, the vital driver is put into a reset state wherein it is restarted. However, the vital driver program includes a relatively long delay, e.g. one or more seconds (although selectable) before execution and production of the enabling output is again available. This ensures that the failure of the vital driver is readily recognizable and cannot be confused with the changing states of the enabling output which might be construed as evidencing appropriate operation.

In accordance with another aspect of the invention, the enabling output is an amplitude modulated signal of selected carrier and modulation rate. This relatively complex signal can be readily distinguished from other signals in a double tuned circuit. The output of the double tuned circuit provides an enabling signal, enabling the outputs of the primary processor to be actually transferred to the outside world. The double tuned circuit can readily detect that both the carrier and the modulation rate are appropriate and coherent. Significantly, there is no oscillator in the apparatus capable of producing the enabling output.

Accordingly, the invention provides processor apparatus for producing a given signal with time sensitive parameters determined from data passed to said processor on a batch basis wherein said given signal may be produced by data of widely different quantities, comprising:

program means including a plurality of program segments, including first program segments which, when executed by said processor, produce segments of said given signal, and second program segments which, when executed by said processor produce a fixed portion of said signal;

means responsive to said data for calling corresponding program segments for execution;

whereby data, having predetermined characteristics, made available to said processor on a batch basis, and at appropriate times, results in execution of a sequence of said program segments so as to produce said given signal with said time sensitive parameters.

In accordance with another aspect, the invention provides apparatus responsive to a sequence of groups of main and recheck words comprising:

means responsive to a group of main check words for determining a sustain time during which a specified output may be produced;

means responsive to a group of recheck words for producing a particular output for a recheck time determined by said recheck words but only if said recheck time, summed with all prior recheck times, produced subsequent to said initiation of the last sustain time, is less than said sustain time, whereby a time sequence of said particular outputs, consisting of an amplitude modulated carrier wherein said carrier frequency and said modulation rate are specified, form said specified output.

BRIEF DESCRIPTION OF THE DRAWINGS

The present invention will now be described in further detail so as to enable those skilled in the art to make and use the same when taken in conjunction with the attached drawings in which like reference characters identify identical apparatus and in which:

FIGS. 6A and 6B illustrate a program segment named SIGANL.

DETAILED DESCRIPTION OF PREFERRED EMBODIMENTS

Figure 1:
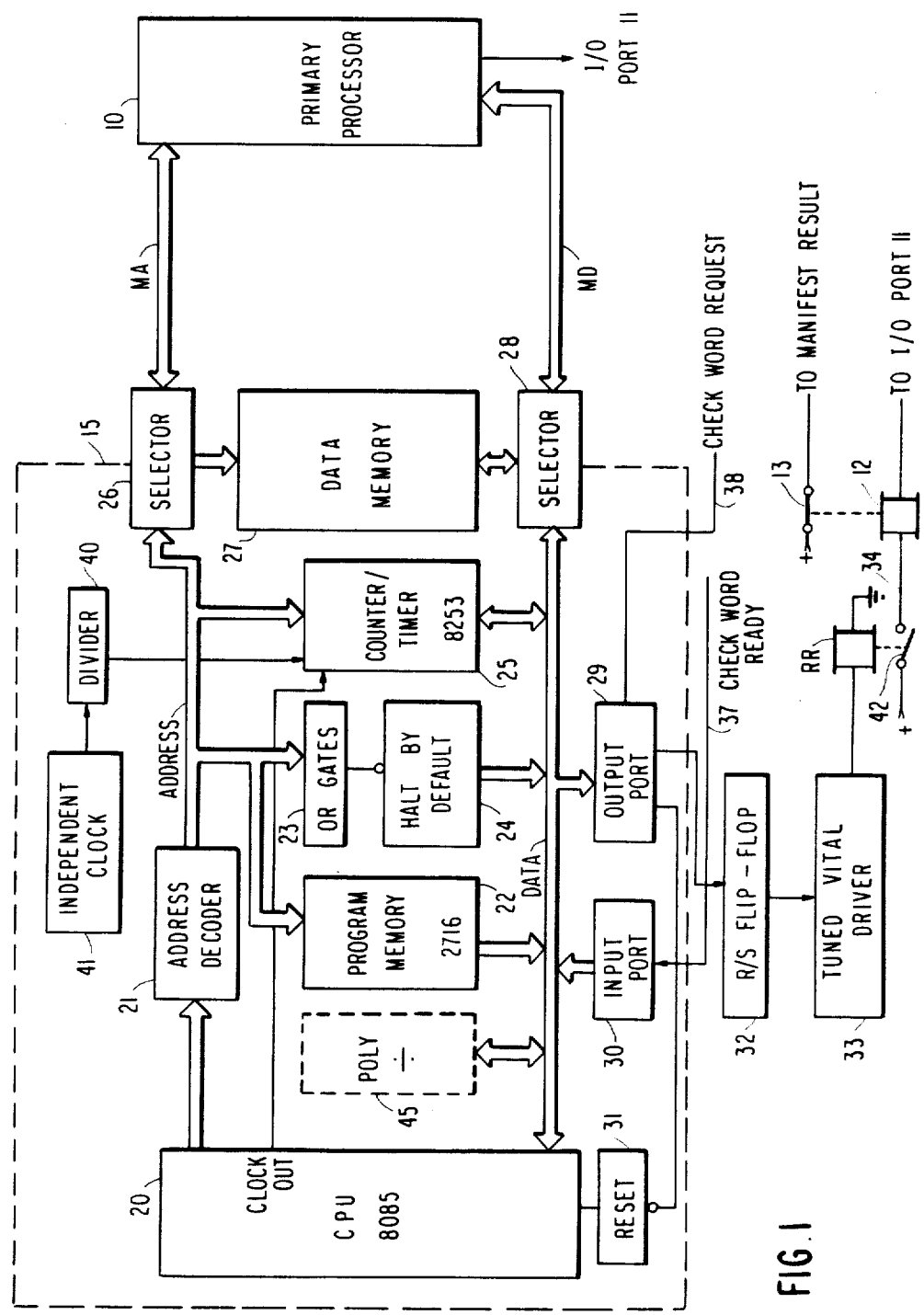
FIG. 1 is a block diagram of the vital driver 15, and its association with a main processor 10.

FIG. 1 is a block diagram of the vital driver 15 and its association with an independently operating primary processor 10 and some of the input/output circuits of the independently operating processor 10. More particularly, as is shown in FIG. 1, a primary processor 10 has a representative I/O port 11 and is provided with an address bus MA and a data bus MD. The primary processor 10, based on inputs made available to it via the I/O port 11 performs the primary function by executing its basic cycle, on a repetitive basis. As a result of performing the primary function, it determines the condition of the representative relay coil 12, which as shown, can be energized via a path from plus via the front contact 42 of a relay RR, to the I/O port 11. Under the circumferences shown in FIG. 1, when the particular bit position to which the relay coil 12 is connected makes available a low potential (so as to sink current through the coil) the front contact 13 of the coil 12 may close supplying a potential to an output to manifest the result provided at the I/O port 11. Note that the relay 12 (representative of all other outputs of the processor 10 which are capable of controlling the outside world) a incapable of being energized unless the relay RR is energized to close its front contact 42 for supplying energy to pick relay 12 via the conductor 34. The relay RR itself is energized via the tuned vital driver 33 when the waveform input to the tuned vital driver 33 matches the characteristics required by the tuned vital driver. That waveform (the enabling output) is supplied by the R/S flipflop 32, which in turn is driven from the output port 29 via conductor 39. If desired, a pair of ports 29 and 29' could drive the R/S flipflop 32 via conductors 39 and 39', where the condition of the ports 29 and 29' is complementary. The output port 29 is controlled by the CPU 20, forming a major component of the vital driver 15 shown in FIG. 1. The vital driver 15 is contained within the dashed lines in FIG. 1. For a more detailed description of a primary processor 10, reference is made to copending application Ser. No. 550,693 of Rutherford filed on even date herewith, and assigned to the assignee of this application. The contents of said application are hereby incorporated by this reference. While FIG. 1 and the specification are directed to an embodiment wherein the primary processor 10 and CPU 20 are implemented as separate devices, it should be understood that this is merely a convenience in using microprocessors such as the processor 10 and CPU 20. Today's microprocessors are not powerful enough for a single such device to handle the functions of both a typical primary processor and vital driver. There is no reason why both functions could not be run in a single device so long as the device is sufficiently fast and/or the function of primary processor 10 is sufficiently simple.

In a preferred embodiment of the invention, CPU 20 may comprise an Intel 8085 and the waveform to which the tuned vital driver 33 responds is an amplitude modulated carrier, for example of frequency 10 kHz, amplitude modulated between off and on states at a 500 Hz rate at a 50% duty cycle. Those skilled in the art will understand that the invention can be applied with processors other than the Intel 8085 and with tuned vital drivers which do not require the particular waveform described above, i.e. the carrier and modulation type and rates may be varied. Furthermore, while a modulated carrier is preferred, the use of such modulated waveform is not essential to the invention.

FIG. 1 also illustrates that the vital driver 15 includes an address decoder 21, a program memory or ROM 22 and a data memory 27 or RAM. The data memory 27, since it is responsive to either the primary processor 10 or the CPU 20 is coupled via selectors 26 and 28 to the address bus of CPU 20 as well as the bus MA, the data bus of CPU 20 and the bus MD.

Also included within the vital driver 15 shown in FIG. 1 is a collection of OR gates 23, whose input is derived from the output of address decoder 21, and which provides an input to a halt by default circuit 24, arranged to halt operations of the CPU 20 on the presentation to the OR gates 23 of specified input addresses (specifically any address out of range of the ROM 22 or RAM 27), the purpose for which will be described hereinafter. A reset circuit 31 is coupled to another output of the port 29 and in turn is coupled to a reset input of the CPU 20, to reset the CPU 20 in the absence of a trigger signal received at a periodic rate, on the input terminal of reset circuit 31.

A data flag for CPU 20 is coupled via conductor 37 to an input port 30, whose input is received from the primary processor 10 indicating that check words, from the primary processor 10 are ready for use by the CPU 20 (i.e. in data memory 27). The output port 29 provides another output via conductor 38 indicating a check word request to the main processor 10. The conditions under which signals corresponding to the check word request and check word ready flag are generated will be described hereinafter. A polynominal divider 45 is also shown which may be used to effect CRC checks described below. This hardware is optional and may be replaced by software functions.

Finally, FIG. 1 shows an independent clock 41 deriving a divider 40, providing an input to a counter/timer unit 25, which receives another input from a clock out terminal of the CPU 20 (the clock of CPU 20 is not explicitly shown). The counter/timer 25 includes a counter which counts in response to the clock out signal from the CPU 20. Accordingly, the counter in the counter/timer 25 counts different clock states of the CPU 20. The counter is controllable via the CPU 20 so that it can be preset. Furthermore, at any time the CPU 20 may read the state of the counter. The counter is employed to verify that each modulation cycle of the enabling output corresponds to a predetermined state count, as will be described hereinafter. The counter/timer 25 also includes a timer which is responsive to the output of divider 40, which itself is driven by the independent clock 41. The timer portion of the counter/timer 25 is also controlled by the CPU 20, so that when desired the timer can be reset. Furthermore, the CPU 20 may, at any time, read the status of the timer in a manner to be described hereinafter. The state of the timer is used to verify that any particular recheck time actually consumed the appropriate time (in one example, 50 milliseconds). Although the designations "counter" and "timer" have been used, it should be apparent that both can be implemented as counters, the "counter" counts clock states of CPU 20, whereas the "timer" counts states of the divided output of clock 41.

Figure 2:
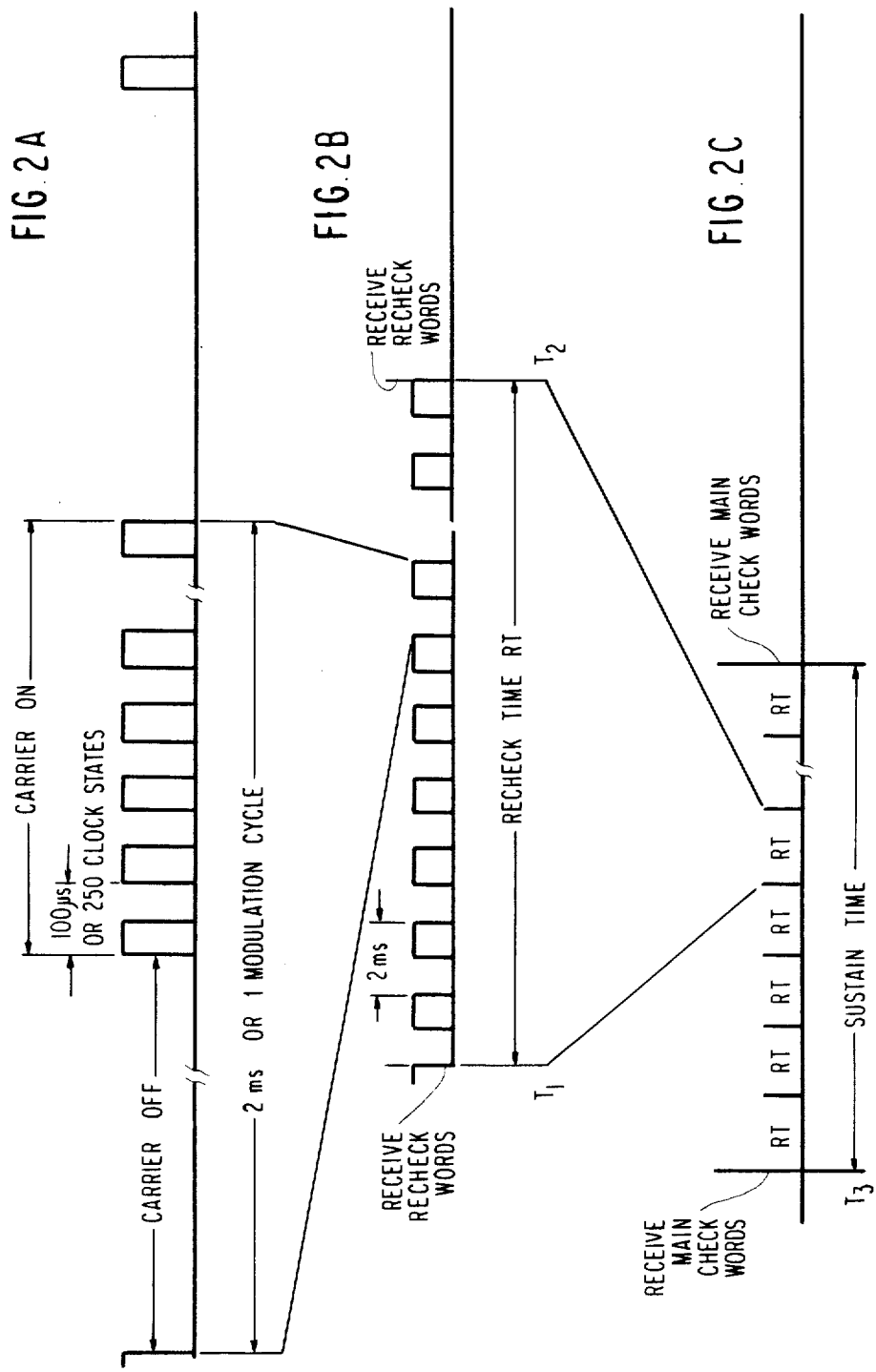
FIGS. 2A–2C illustrate the format and duration of the enabling output, on different time scales.

Before describing, in more detail, the operation of the components shown in FIG. 1, reference is made to FIGS. 2A-2C to illustrate a time hierarchy and the manner in which the enabling output is provided by the output port 29 and used, via the tuned vital driver 33 to sustain the relay RR. More particularly the basic time unit in the vital driver is a processor clock state, e.g. 0.4 microseconds, in one embodiment. The vital driver 15, in executing its program, generates a carrier period, for example 100 microseconds, in 250 clock states. A sequence of modulation on and modulation off, one millisecond for each, generates a modulation cycle 2 milliseconds in duration, corresponding to a 500 Hz modulation rate. As will be described, a pair of 16-bit (or any other appropriate bit length) check words can select a program segment to generate a modulation cycle (2 ms), or one or more carrier cycles (either a carrier on or carrier off, of duration 100 $\mu$sec $\times$ N, where N is any integer from 1 to 10). A table or group of recheck words generates a selected number of modulation cycles to produce a required recheck time. The recheck time is determined, in part, by the number of recheck check words in the group or table. A recheck time is an integer number of modulation cycles (for example 25).

FIG. 2B illustrates a recheck time RT as extending between receipt of a first group of recheck words at time $T_1$, to a time $T_2$ at which a second group or table of recheck words are received. Desirably, the recheck time is composed of a fixed (but selectable) number of modulation cycles, each modulation cycle may correspond to 2 milliseconds. Since the recheck words received at $T_1$ authorize a fixed number of modulation cycles of the enabling output, the second group of recheck words must be received within this time or the enabling output terminates. It will be appreciated, therefore, that the time scales of FIGS. 2A and 2B are significantly different.

Finally, FIG. 2C illustrates that a sustain time is comprised of a sequence of recheck times RT, the number of recheck times contained in a sustain time is determined in part by the number of main check words actually received at $T_3$, for example. Accordingly, at time $T_3$ a group of main check words is received. This conditionally establishes the sustain time, however each recheck time requires receipt of a new group of recheck words. Accordingly, the sustain time can be selected as the time required for the primary processor 10 to execute a basic cycle, i.e. that time required for the primary processor 10 to respond to its inputs and determine updated values to be assigned to its outputs. So long as the groups of recheck words are received at the appropriate rate, in the appropriate number, carrying the appropriate values, the appropriate number of recheck times will be generated. During the course of each recheck time, the output port 29 makes available, via conductor 39, the waveform shown in FIG. 2A (the enabling output of the vital driver), which produces the appropriate output voltage (enabling signal) from the tuned vital driver 33 to maintain the relay RR energized. Desirably, the recheck time is selected as the time within which the outputs of the primary processor 10 must be verified (so as to detect a failed output circuit for example). As mentioned above, this ability to freely select the sustain time and recheck time allows the output circuits of the primary processor 10 to be checked at a more frequent interval than the time required for the primary processor 10 to execute its basic cycle.

Accordingly, and referring to FIG. 1 again, when a group of main check words is available to the CPU 20 (located in the data memory 27), the program (in the ROM 22) causes the processor 20 to examine the main check words for accuracy and determines, from the number of check words, a (conditional) sustain time. In addition, a single recheck time is authorized by the first group or table of main check words since a table of recheck words is also sent at the same time. Accordingly, during the course of this recheck time, the main and recheck check words are tested and destroyed. Assuming the words were appropriate, the enabling output shown in FIG. 2A is generated for a fixed time, the recheck time in the course of checking and destroying the recheck check words. Because of the flexibility of the invention, the recheck time can be produced from a set of words of widely different number.

Thereafter, at the conclusion of the first recheck time, assuming additional recheck words are available, they are tested and destroyed, which consumes such time as to result in the generation of the output signal for an additional recheck time. So long as continued groups of recheck words are available, the process continues for as long as the initially authorized sustain time. At the expiration of the initially authorized sustain time, an additional group of main check words must be available, otherwise the production of the enabling output and enabling signal terminates.

In accordance with the invention, the basic cycle executed by the primary processor 10 may generate a number of check words within wide limits, e.g. from 25 to as many as 1000 or more. By employing the principles of the invention, the recheck and sustain times can be accommodated as independent variables, so long as the number of main check words authorizes the required number of recheck times. Furthermore, the vital driver has no a priori knowledge of either the sustain or recheck time and thus the primary processor can alter either parameter by appropriate changes to the number and/or content of the check words.

As indicated, time is divided into a hierarchy, which is shown in FIGS. 2A-2C. Significant periods are the modulation cycle (an integer number B of carrier cycles) and the recheck time (an integer number A of modulation cycles). The integers A and B are completely independent. Furthermore, the number of check words required to produce the modulation cycle is also an independent variable. Checking occurs at a number of levels. First, of course, each check word value must be the expected value or it is ineffective, i.e. it will not produce the result which is required to be produced by that check word. Furthermore, since the entire program is made up of sequential program segments, the loss of a single check word breaks the chain and will most likely result in a halt of the vital driver 15. At a second level, the duration of each modulation cycle is checked against the state counter, which must show the expected value. Third, each recheck time is also checked against an independent timer, and again the relationship must be the expected one.

When the vital driver 15 is first energized, or has been reset, the vital delay is generated which is a period during which no output is available. This delay time may be specified to be any number of seconds, for example, one second. At the completion of the delay, a flag is sent to the primary processor, e.g. check word request. The purpose of the delay is to ensure that all signal devices, e.g. relay 12, connected to outputs of the primary processor 10 have time to release before the system resumes operation after it stops for any reason.

As will be described hereinafter, the vital delay is effected by a vital timing routine similar to that disclosed in my earlier U.S. Pat. No. 4,181,849. The exit is a branch to an address computed from the states of vital counting registers at the time of exit.

As described, the primary processor 10 and the CPU 20 of the vital driver 15 operate independently. On the other hand, the vital driver 15 must receive groups of recheck words at the appropriate time in order to maintain the enabling output. The primary processor 10 stores the first table of (main and recheck) check words in the data memory 27 as soon as it has generated them. Subsequent tables of recheck check words are put in the memory 27 at regular intervals determined by the primary processor 10 recheck times. The vital driver 15 executes a program segment GETCHK, when new check words are expected. A small number of modulation cycles are generated by this program segment—typically four carrier cycles, selected by the primary processor by assigning appropriate values to two parameters that are passed along with the main check words. The data memory 27 is not used during the execution of GETCHK so it is available for the primary processor 10 to load tables of check words. When the check words are loaded, execution of this program segment is terminated when the next modulation cycle has been completed. If the difference in frequency between the primary processor 10 and the vital driver clocks cause the two processors to be out of step by 2 milliseconds, the vital driver 15 adjusts its phase by that amount by adding or deleting one modulation cycle. If the vital driver 15 and primary processor 10 lose synchronization altogether, the vital driver 15 stops generating the enabling output. When the processor 20 resets, the vital driver 15 initiates the vital starting delay ensuring that the outputs of the main processor 10, e.g. relay 12 are cleared or drop away.

DESCRIPTION OF PROCESSING

The software (or firmware) which determines the steps carried out by the vital driver 15 (and particularly the CPU 20 thereof) are described in more detail in FIGS. 3, 4A–4B, 5A–5J, and 6A and 6B.

Figure 3:
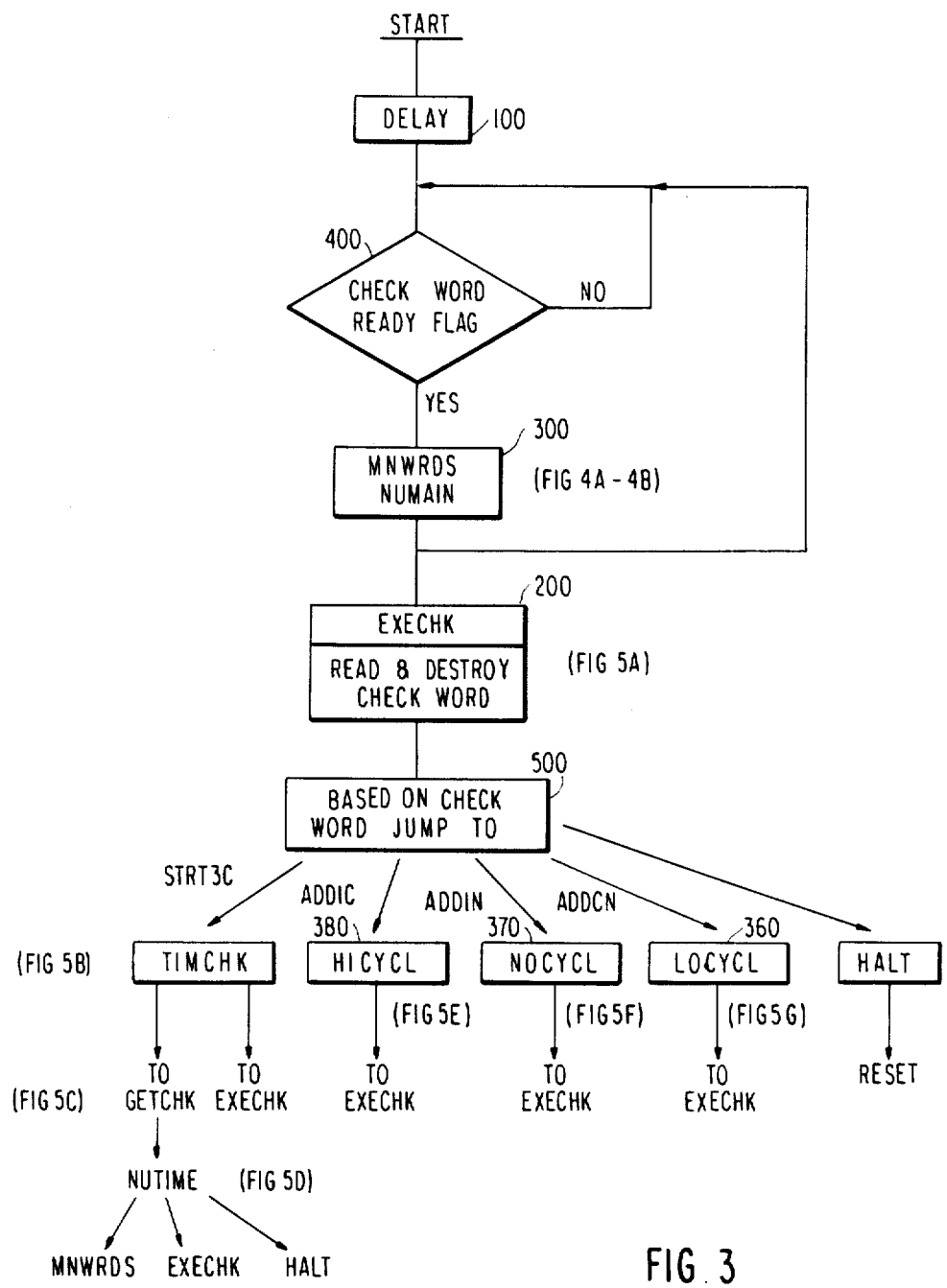
FIG. 3 is an overall flow diagram of the vital driver program.

Referring first to FIG. 3, an overview of the processing is illustrated. As shown in FIG. 3, three segments, Delay 100 (for providing the vital starting delay), MNWRDS/NUMAIN 300 (for operating on main check words) and EXECHK 200 (to execute a check of a recheck word), is followed by a jump to one of four specific segments, or to an indeterminate location. The jump to any of the four specific segments (TIMCHK, HICYCL, NOCYCL or LOCYCL) is determined by the check word produced by execution of EXECHK. If the check word so accessed does not match one of the specific segments, then a halt state is entered which, after a fixed period of time, results in a reset, as shown in FIG. 3. A wait loop (function 400) is provided for marking time (with no significant output) until the primary processor indicates that a table of main check words are ready. The MNWRDS/NUMAIN processing immediately checks the table of main check words, by reading and destroying them. As is described below the reading process requires that the main check words be accessed in the proper order and that they have the proper relationship with previously used check words. The reading process builds a token table, which will be used to authorize each recheck time, one token per recheck time.

After NUMAIN, EXECHK takes over and reads the first recheck word, again in such a manner as to destroy it. The recheck word reading is also arranged such that the recheck words must be accessed in the proper order. A recheck word (if appropriate) may direct the processing to one of NOCYCL, HICYCL or LOCYCL. Each segment consumes a second recheck word and in the process an amount of time. HICYCL and NOCYCL are complementary in that each consumes an amount of time equal to ½ a carrier period, HICYCL produces an ON output (carrier on), NOCYCL produces an OFF output (carrier off). EXECHK is arranged to consume an equal ½ carrier period, so the combination of EXECHK and either HICYCL or NOCYCL consumes a full carrier period. LOCYCL consumes a time determined by the value of the recheck word. Each recheck word (if correct) directs processing back to EXECHK. TIMCHK is called by EXECHK at the end of each modulation cycle to test the number of state counts. Again, the time consumed by TIMCHK (and EXECHK) is arranged to be predetermined so the pattern of the output is fixed. This continues to the end of a recheck time where EXECHK calls GETCHK. GETCHK is arranged to mark a short period of time (producing the vital output) until the next table of recheck words is available. The combination of EXECHK and GETCHK is arranged to consume an equal number of carrier on and carrier off periods. At the end of a sustain time, new main and recheck tables are loaded and the process is repeated. The checking is effected by the results produced by the check words, i.e. producing the output of specified, time-sensitive pattern, can only occur if the expected check words are received. The wrong check words will cause the output pattern to depart from the intended pattern which will be detected by the double tuned circuit. This operation is many times safer than merely comparing check words to a stored table of "right" answers as should be apparent.

As shown in FIG. 3, after the start delay, function 100, the CHECK WORD READY FLAG, is tested (see FIG. 3) at function 400. When the CHECK WORDS are loaded to data memory 27 by the primary processor, the test is passed and function 300 is performed; which is described in detail in FIG. 4A.

Before referring to FIG. 4A, however, the content of the main and recheck word tables will be described. The main check table is loaded in RAM 27 by the primary processor 10 at the conclusion of any basic cycle. The main check word table includes a label, identifying a main check word table and two further portions, a first portion which is of variable length and contains a variable number of main check word pairs. The number of main check words or main check word pairs determines the number of recheck times that are conditionally authorized by the main check word table, a main check word pair is required for each recheck time subsequent to the first.

Reading and testing check words (either main or recheck) proceeds so as to verify that the words have been accessed in the proper order. At start up (or on reset), certain initialization data (to be described) is used, one set for main check words and a different set for recheck check words. This initialization data includes the parameters INCREMENT and ΔINCREMENT, DISPLACEMENT and ΔDISPLACEMENT. These parameters are used in a manner now to be explained, to ensure that the check words accessed by the vital driver program are accessed in an appropriate sequence. The check words (both the main and the recheck check words) placed in the RAM 27 by the primary processor 10 are not the check words which will produce the appropriate action of the vital driver 15, the vital driver 15 must first modify the check words before they will be appropriate. Since, as will be described, the modification is not constant, the check words must be accessed in the correct order to produce the expected result. The modification consists of adding a value OFFSET to each check word. The value OFFSET changes each time it is used, and the amount by which it changes is the value INCREMENT. The vital driver 15 has no apriori knowledge of OFFSET or INCREMENT; rather these are built in a manner to be described.

At system start up, or on a reset, a value OFFSET is derived by summing INCREMENT and DISPLACEMENT. The result is OFFSET. Since OFFSET is continually changing, we will identify a particular value of this quantity as OFFSET (X,Y), where X identifies the recheck time within which the quantity is used (i.e. X is 1 in the first recheck time, 2 in the second, etc.), and Y indicates the particular check word, in the sequence the check words are accessed, with which the value is used. Accordingly, immediately after deriving OFFSET, the vital driver has in fact derived OFFSET (1,1). The vital driver then modifies the first check word by summing it with OFFSET (1,1), placing the sum, which is now the modified check word in an internal register in the CPU 20, and overwriting the check word with the parameter INCREMENT. This obviously destroys the check word 1.

Before the next check word is accessed, the value, OFFSET (1,1) is summed with INCREMENT. INCREMENT is derived from the location of check word 1 to prove that the prior check word was actually destroyed. This sum, OFFSET (1,2) is then summed with check word 2, and the result is the next modified check word which will be employed by the vital driver 15. The quantity INCREMENT is now overwritten into the location of the data memory 27 at which the unmodified check word 2 was originally located, destroying check word 2.

After completely processing the main check word table, the table has had each of its check words replaced by the values INCREMENT.

As described in the co-pending Rutherford application, the primary processor 10 is arranged to produce the check words in a complementary manner. That is, on each basic cycle the check words which are produced are in fact constant (i.e., they do not change from cycle to cycle unless there is an error). However, the primary processor modifies each check word using a changing P-OFFSET, which is independently derived by the primary processor. Thus, the independent process of producing OFFSET (in the vital driver) and P-OFFSET (in the primary processor) must proceed in step and the check words accessed in the vital driver must be in the correct sequence to continue expected processing.

There are many arithmetic techniques that could be used. For example, the primary processor 10 could subtract P-OFFSET from each check word. The vital driver could then add OFFSET to each check word. If P-OFFSET is equal to OFFSET, then the original check word is the result. In an embodiment actually constructed, both machines add modulo 2, bit by bit (where the addition obeys the rules, $1+1=0$; $1+0=1$ and $0+1=1$).

The main check word table also includes two additional parameters CYCNBR and CYCTOT. These are used in the segment GETCHK, described below to define a window. The window is the length of time, after conclusion of a first sustain time, during which the enabling output is produced in the absence of further check words. At the conclusion of the window, in the absence of further check words, the enabling output terminates. The same type of window is used at the end of a recheck time for the same purpose.

The primary processor 10 loads a first table of recheck check words at the same time as the main check words are loaded. The recheck check words are modified in the same fashion, although using a different set of parameters. When the next group of recheck check words is received, it is the second group of recheck words, to authorize the second recheck time. The vital driver 15 requires OFFSET (2,1). This is produced by summing INCREMENT with ΔINCREMENT, and storing the sum as INCREMENT, summing DISPLACEMENT, and ΔDISPLACEMENT and storing the result as DISPLACEMENT. INCREMENT and DISPLACEMENT are summed to produce OFFSET (2,1). With the value of OFFSET (2,1), the first recheck check word can now be accessed, modified and employed. The processing continues by continually incrementing OFFSET (2,Y) as the processing proceeds through the recheck table. Each new RECHECK WORD TABLE is processed by incrementing INCREMENT and DISPLACEMENT (by ΔINCREMENT and ΔDISPLACEMENT) and the sum used to produce OFFSET (X,1). The manner in which the check words are produced by the primary processor 10 is described in co-pending Rutherford application filed herewith and assigned to the assignee of this application.

Figure 4A:
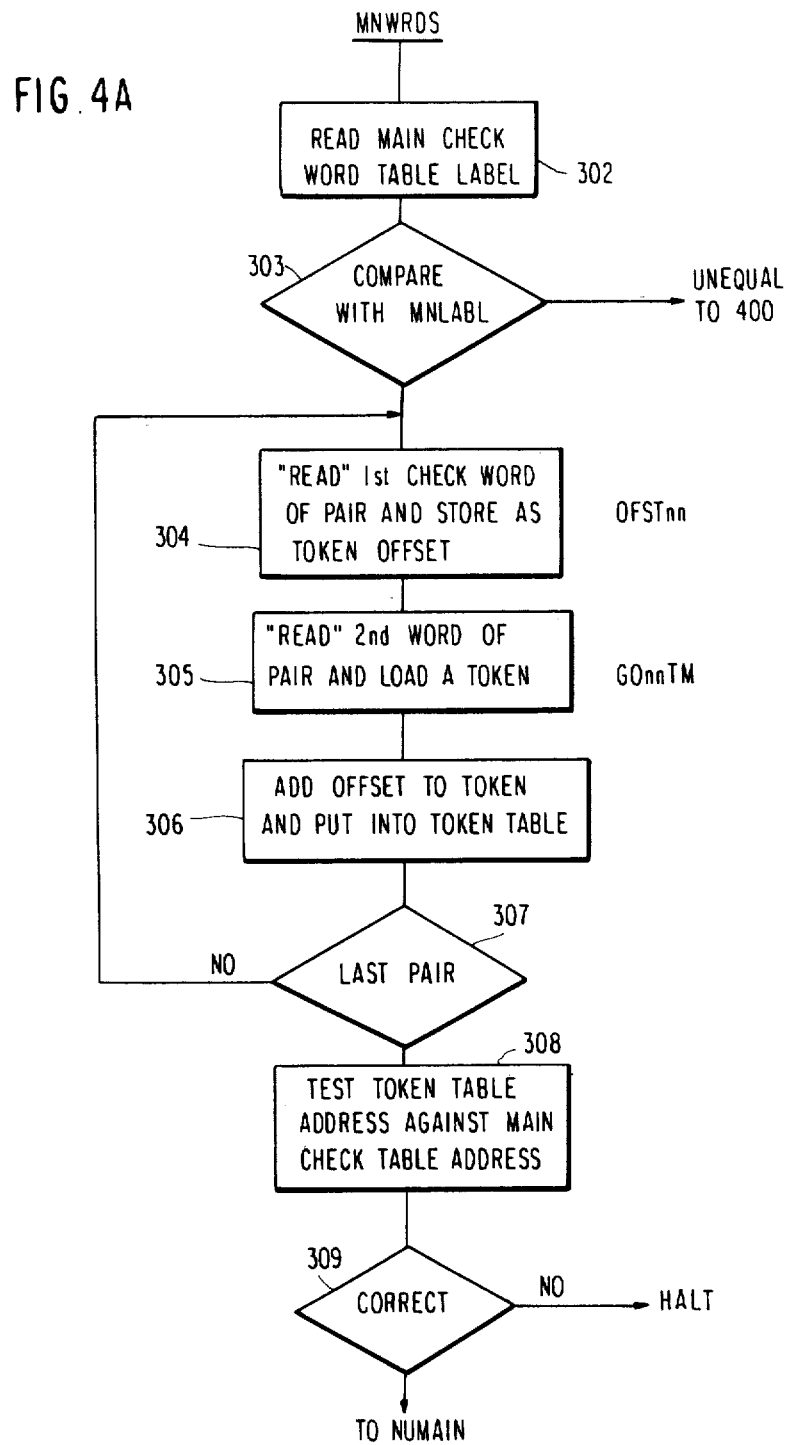
FIGS. 4A and 4B illustrate a flow chart of a program segments MNWRDS and NUMAIN, respectively.

Referring now to FIG. 4A, the processing MNWRDS is illustrated. Function 302 tests the main check word table label. The main check word table, and the label, is written by the primary processor 10. Once read, function 303 branches depending upon the result of the test. If the test was failed, processing loops back to function 400. A failure at this point generally indicates that the main check word table has not yet been written and therefore waiting at step 400 is appropriate.

On the other hand, if the label is okay, then function 304 "reads" the first check word of a check word pair and stores the check word or a value derived from the check word as TOKEN OFFSET. Although not shown in FIG. 4A, reading a check word (function 304) is effected with the steps explained above. These steps are explicitly flow charted and discussed in connection with EXECHK (see FIG. 5A), below.

Function 305 "reads" the second check word of the first check word pair (in the same function) and loads it in a location TOKEN. Function 306 adds TOKEN OFFSET (from function 304) to the TOKEN and the result is stored in TOKEN TABLE. Accordingly, functions 304-306 build from the main check word table a TOKEN TABLE, one token to a pair of check words. Although not shown in FIG. 4A, the processing may include jumps in the program based on using check words or their derivatives as addresses so that processing will not proceed unless the expected check words are found or produced in "reading". Each TOKEN in the TOKEN TABLE will authorize a single recheck time. Function 307 checks to see if the next check word pair is the last word pair, and if not functions 304-306 are repeated for each other word pair. When all the word pairs have been processed, function 308 tests the TOKEN TABLE address against the main check word table address. Since the TOKENS are added into the TOKEN TABLE as a function of the main check words in the main check word table, there should be a predetermined relation between the extent of the main check word table and the TOKEN TABLE. Function 309 branches on that relationship, if incorrect the branch is to an incorrect location which will result (directly or indirectly) in a HALT condition. If the relationship is correct, processing skips to NUMAIN.

Figure 4B:
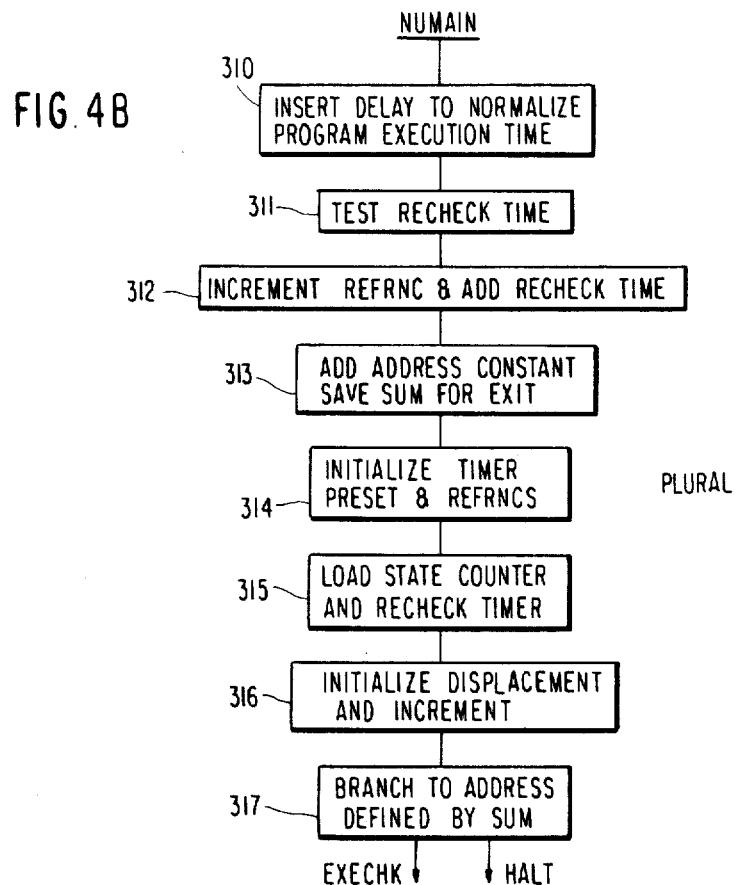

NUMAIN is shown in FIG. 4B. Function 310 inserts a delay in the processing to normalize program execution time. NUMAIN, initiating a sustain time effects a function similar to GETCHK, at the beginning of a recheck time. The delay 310 is empirically selected so that the GETCHK and MNWRDS/NUMAIN processing consume roughly equal times. Exact equality is achieved, even though GETCHK has a margin of about a modulation cycle (2 ms.), by the ability to make compensating changes in the parameters. Function 311 begins a test of the duration of the last recheck time. Since we are processing NUMAIN, the last recheck time of the immediately preceding sustain time has just expired. Therefore, the timer status can be checked to determine the length of the last recheck time. Function 311 reads the value of the timer. Function 312 increments a quantity REFRNC and adds it to the value of the timer read at 311. Function 313 adds a constant and saves the sum. Function 314 initializes timer related quantities PRESET and REFRNC (values which will be employed in subsequent processing, as will be described). Function 315 loads the state counter and timer (both contained in counter/timer 25) with the initialized constants and allows them to run. Function 316 initializes DISPLACEMENT and INCREMENT (described above) for processing recheck check words. Finally, function 317 branches to an address defined by SUM (saved at function 313). Since this SUM depends on the time related duration read from the timer at function 311, the branch to EXECHK is only performed if the timer read the expected value, i.e. the recheck time duration was appropriate. Any other result will lead (directly or indirectly) to a HALT.

Figure 5A:
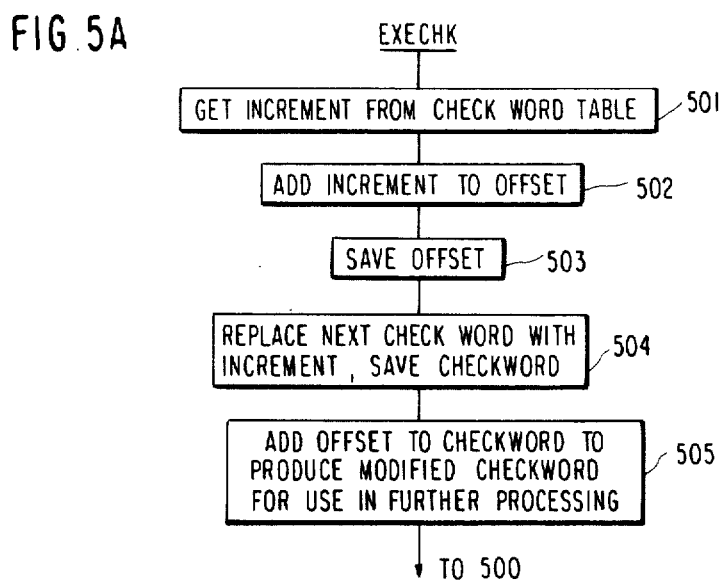
FIG. 5A is a flow chart of the program segment EXECHK.

The EXECHK processing is shown in FIG. 5A. Since MNWRDS has destroyed the main check words, this processing is effected on the first set of recheck words which accompanied the main check words. In subsequent recheck times, only recheck words are received. Function 501 obtains the quantity INCREMENT from the check word table (this has been initialized at function 316). Function 502 adds INCREMENT to OFFSET (i.e. the OFFSET left after processing the previous recheck table) and function 503 saves the updated OFFSET. Function 504 reads the next check word (at this time the first recheck word) and replaces the next check word with the newly initialized INCREMENT; this destroys the check word in the check word table. The check word extracted from the table at function 504 is added to OFFSET at function 505; this is a modified check word which will be employed in later processing. Thereafter, processing skips to function 500.

Referring back to FIG. 3, function 500 is a jump based on the check word (as modified at function 505). The particular segment jumped to will be either NOCYCL, HICYCL, LOCYCL or TIMCHK, based on the following criteria. Referring briefly back to FIG. 2B, we see that each recheck time includes a number of modulation cycles, and each modulation cycle includes a period in which the carrier is nominally on (during which the output bit is alternately on for 50 microseconds or 125 clock states and then off for an equal period) and an equal 1 millisecond duration during which the carrier is off. Under these circumstances, the first check word could direct us to NOCYCL, since, as will be described below, running NOCYCL does not make the output bit true (corresponding to a carrier on). Normally, we check the duration of each modulation cycle at the conclusion. The exception is the first recheck time, here we merely initialize some parameters, using the NOCHEK entry to TIMCHK. The first modulation cycle starts with TIMCHK, the period corresponding to the ½ carrier cycle consumed by the preceding execution of EXECHK is tacked onto the last modulation cycle.

TIMCHK is designed to consume a fixed time corresponding to a fixed number of carrier cycles, e.g. 3 to 6 (or 6 to 12 half cycles). The first function, 320, tests the state count. The state count is reflected in the status of the counter in counter/timer 25 (see FIG. 1). In order to ensure that a fixed error condition cannot result in passing the state count test, two quantities are used in concert; REFERENCE and PRESET. In general, the state counter is preset to some quantity (PRESET) and it counts clock states of the processor 20 until it is read. The clock count is added to a further quantity; REFERENCE. The sum is used as a branch address. To ensure that a state counter stuck at a particular count or circuitry producing a static quantity each time the state counter is read (regardless of the actual count) cannot pass the test, the quantities PRESET and REFERENCE are manipulated so that while the actual change in state count is constant, the beginning (and therefore the ending) values are different. In the examples shown in FIG. 5B, PRESET is decremented each time the routine is executed. The quantity REFERENCE is incremented. Under these circumstances, the state counter, after being preset, is down counted from a beginning (or preset) to a final value. The final value is added to the incremented quantity REFERENCE and each time through, if the state counter changed state by a fixed number of states, the sum will be constant. Those skilled in the art will readily understand that other combinations of manipulating PRESET and REFERENCE and either counting up or down, can be employed to produce the same result. Function 321 branches on the sum, if the sum is the expected value, then processing picks up at function 323; any other event will produce a halt, either immediately, or after some indeterminate processing.

Function 323 completes the state count processing by decrementing the quantity PRESET and loading the state counter. (This is also our initial entry point NOCHEK.

Function 324 then extracts the next check word and executes a branch on it. Function 324 actually comprises functions 501-505 (see FIG. 5A), namely, the check word from this table is modified, and saved, and the original check word is destroyed.

The next check word (as modified at function 324) can produce one of four branches, depending on the value of the word. For example, check word ADD00 will redirect the processing back to EXECHK. On the other hand (and continuing with the example being described wherein we need 20 half carrier cycles to equal half a modulation cycle, we assume that TIMCHK has produced 6-12 carrier half cycles, we wish to complete the carrier off part of the modulation cycle by adding more carrier off cycles. This can be accomplished by use of more check words and NOCYCL. After the carrier off half of the modulation cycle, we need alternating carrier on and off half cycles. This is provided by alternately executing EXECHK and HICYCL (a ½ carrier cycle for each). This would be followed by TIMCHK to again check the duration of the modulation cycle.

As we near the end of a recheck time, the last recheck word will be CHKWRDS. If the check word read at function 324 corresponds to CHKWDS (indicating that the recheck time is concluded), then processing skips to function 326. Function 326 accesses the next check word token. This will specify whether we have terminated a recheck time or the sustain time. In either event, function 327 is performed to extract the quantities CYCNBR and CYCTOT, specifying an extent of time for a receiving window. Thereafter, GETCHK is executed. As we will see below, GETCHK provides two functions; it produces the enabling output for a determined period of time, determined by the parameters CYCNBR and CYCTOT. If, at any time during this receiving window, the primary processor 10 indicates that check words have been loaded, the modulation cycle then in progress is completed, the receiving window is cut short at this point and a new recheck time or sustain time is begun. The receiving window provides for some elasticity to absorb small amounts of time slippage between the vital driver 15 and the primary processor 10. If the receiving window expires without receipt of check words, the enabling output terminates and the vital driver 15 goes into a wait loop awaiting receipt of the check words. GETCHK will be described in detail in connection with FIG. 5C.

In order to show the modular nature of this processing, we will refer first to the basic elements HICYCL and the complementary NOCYCL.

Figure 5B:
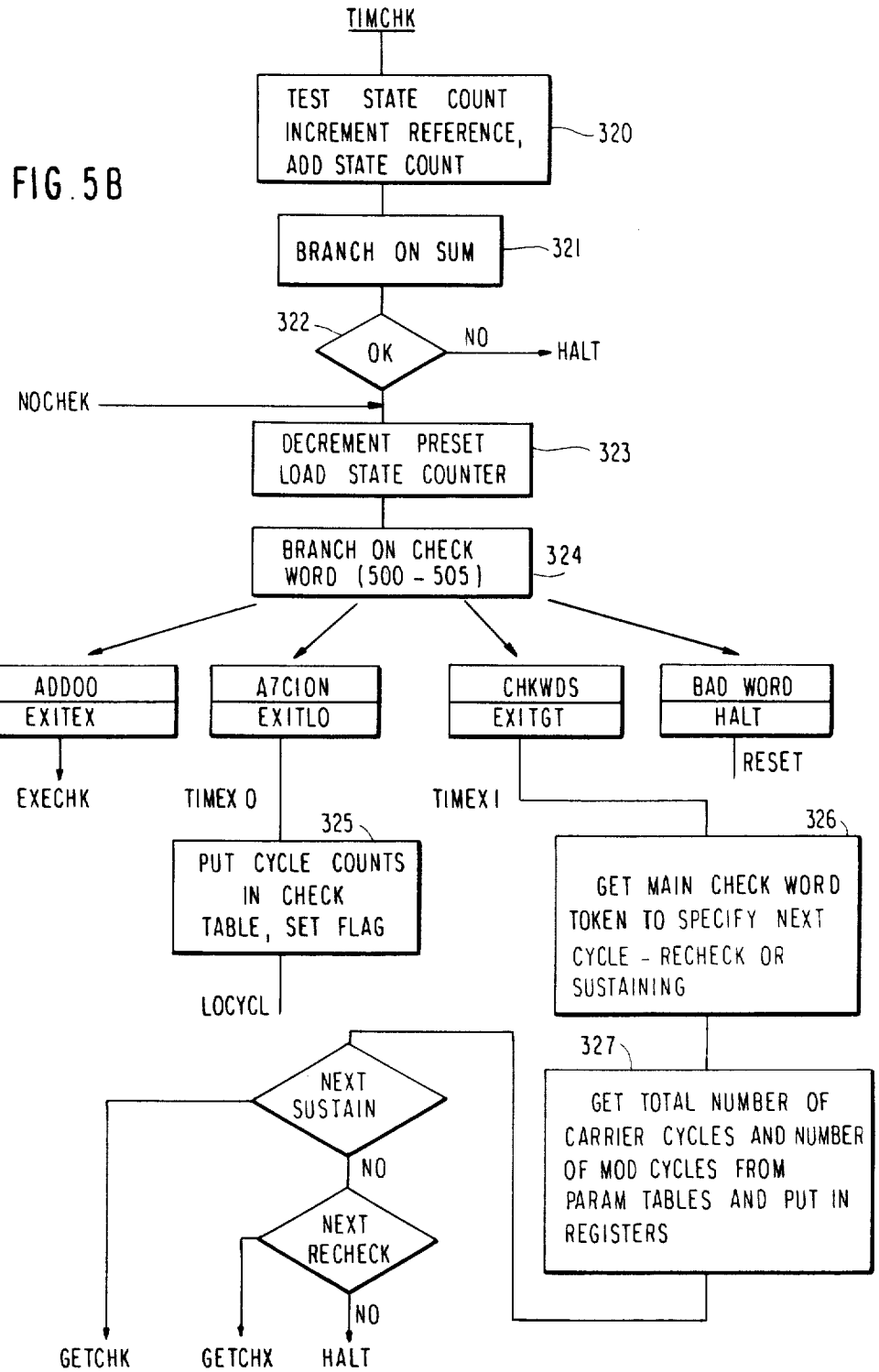
FIG. 5B is a flow chart of the program segment TIMCHK.
Figure 5D:
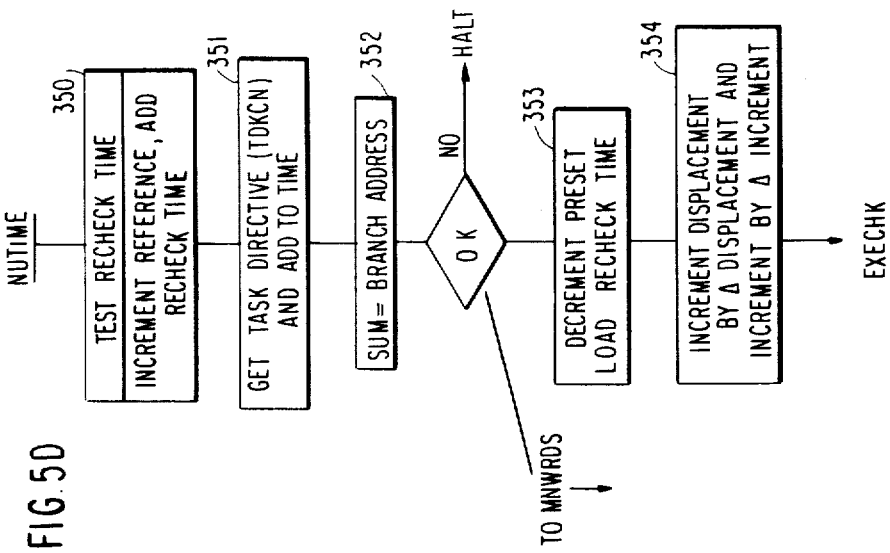
FIG. 5D is a flow chart of the program segment NUTIME.
Figure 5C:
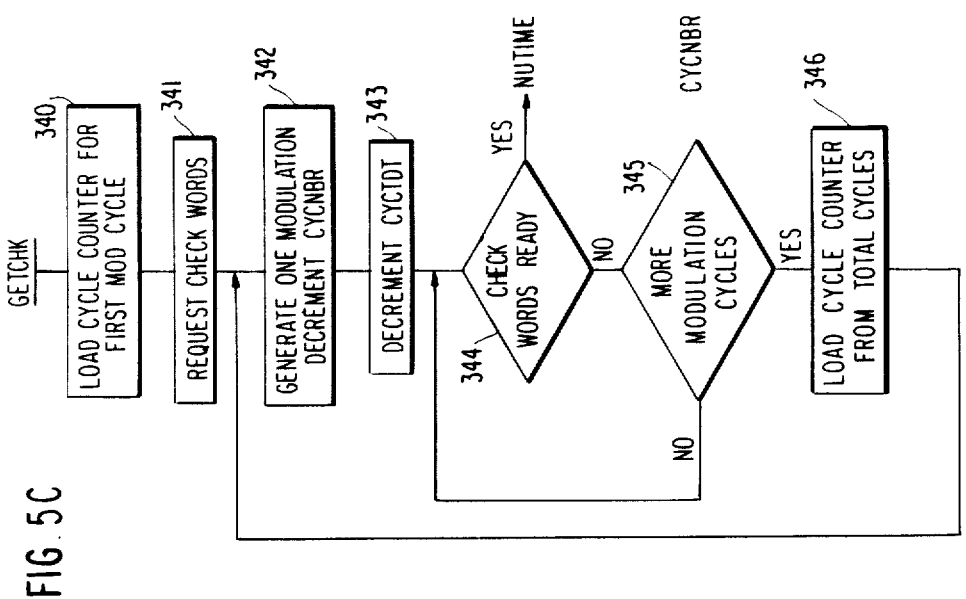
FIG. 5C is a flow chart of the program segment GETCHK.
Figure 5F:
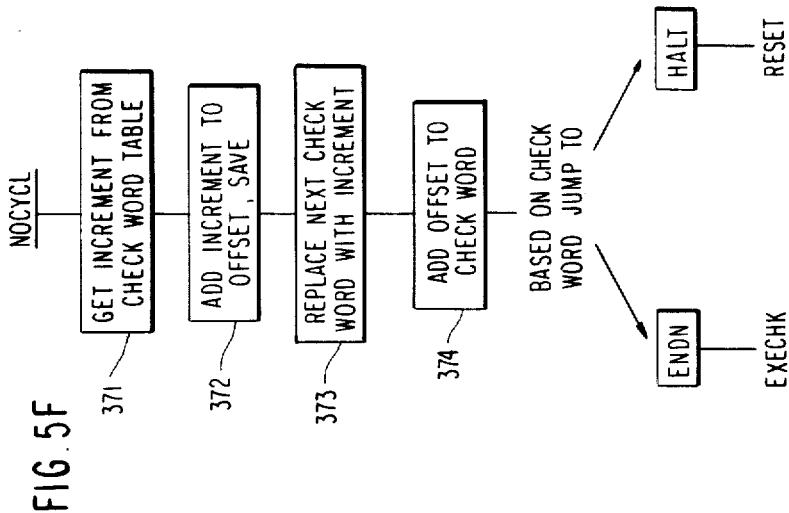
FIG. 5F is a flow chart of the program segment NOCYCL.
Figure 5E:
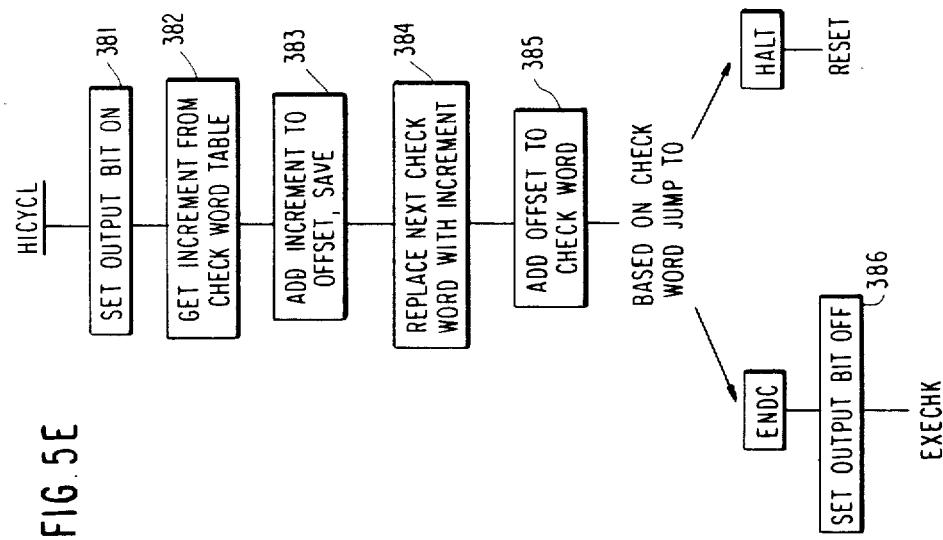
FIG. 5E is a flow chart of the program segment HICYCL.

HICYCL is shown in FIG. 5E. The first function, function 381, sets the output bit on. Functions 382–385 are similar to the EXECHK functions 501–505. Finally, if the check word is modified at function 385, and gives the expected value, then the jump is to EXECHK through function 386 which sets the output bit off. Execution of HICYCL and EXECHK each consumes a period of a half carrier cycle. By concatenating HICYCL and EXECHK, one after the other, we produce the effect of a single carrier cycle (carrier on). Refer now to FIG. 5F—NOCYCL. The functions 371–374 are identical to the functions 382–385 (FIG. 5E) and 501–505 (FIG. 5A), and thus consume an equivalent amount of processing time. Since there is no function in NOCYCL corresponding to functions 381 and 386, the output bit remains off when NOCYCL is processed. Accordingly, by concatenating NOCYCL and EXECHK, we consume a period of one carrier cycle (carrier off). Since the jumps from EXECHK to either HICYCL or NOCYCL, as well as the jumps from HICYCL or NOCYCL back to EXECHK all depend on the value of the check word (as modified), these segments will be performed and linked only if the original check words are the expected value, and they are accessed in the proper order.

Were the vital driver program not to have any basic output bit manipulating routines other than EXECHK, NOCYCL and HICYCL, then the enabling output could only be produced by a rigidly proportional number of check words, and it is of course one object of the present invention to produce the enabling output with a variable number of check words. This capability is satisfied by LOCYCL.

Figure 5G:
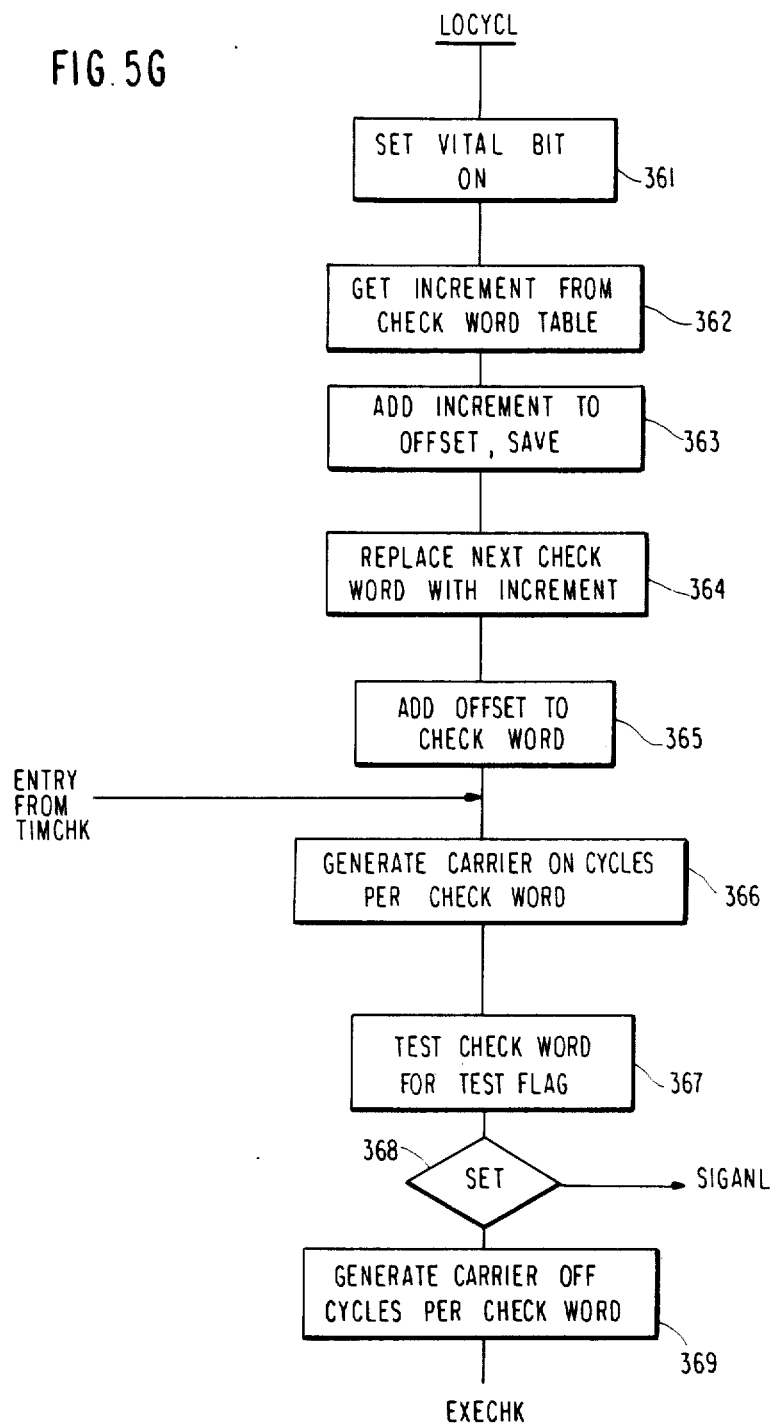
FIG. 5G is a flow chart of the program segment LOCYCL.

Refer now to FIG. 5G.

As shown in FIG. 5G, LOCYCL has two entry points, the entry point at function 361 is direct from EXECHK (as will be described), the entry point from function 325 (FIG. 5B) is at function 366. Function 366 generates the carrier on and off cycles derived from the check word extracted from the recheck word table. From function 366, processing returns to EXECHK at function 506. Functions 361–365 are similar to the functions that we have seen with respect to HICYCL, NOCYCL and EXECHK. However, the presence of functions 366 and 369 allow us to generate a variable number of carrier on cycles (function 366) and a variable number of carrier off cycles (function 369) from the value of the check word. Function 366 merely sets up a register with the desired number of carrier on cycles, sets the output bit and times ½ carrier cycle, changes the output bit from on to off, times another ½ carrier cycle, decrements the register, and if non-zero, repeats the steps until the register has been completely decremented. Function 369 is similar, except that output bit is maintained off for the entire operation. These functions enable us to provide a variable number of carrier cycles from a fixed number of check words. Note also that LOCYCL can be entered at function 366 from TIMCHK so that it does not consume an additional check word, as it would if functions 362–365 were performed. The effect of functions 367, 368 and the branch to SIGANL will be discussed below.

Finally, refer again to FIG. 5G and recall that we have not yet discussed functions 367, 368 and SIGANL.

Figure 6B:
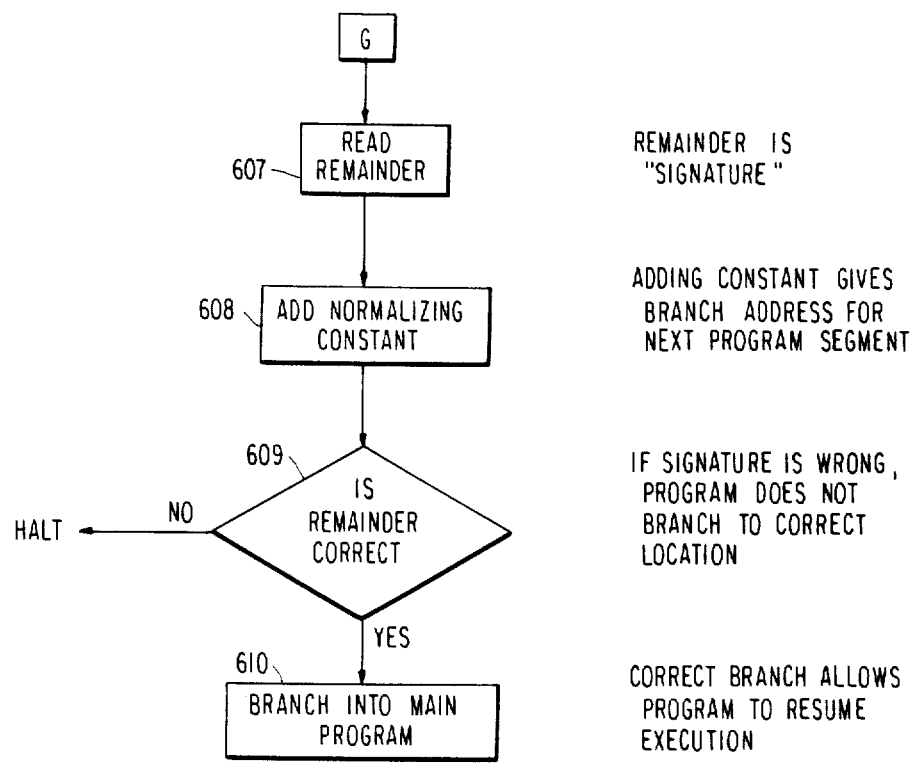

When LOCYCL is entered from TIMCHK, the last function in TIMCHK (function 325) sets a flag. After generating the appropriate number of carrier on cycles (function 366), function 367 tests to see if this flag is set. Accordingly, when LOCYCL is entered from TIMCHK, the flag will be set and thus the branch at function 368 is to SIGANL rather than to function 369. The processing of SIGANL is shown in FIGS. 6A and 6B. The function of SIGANL is to test program memory, to guard against any failures in ROM. Function 601 initializes a source pointer to the top of program memory and a corresponding table pointer to a first normalizing constant (also in ROM). Function 602 increments the pointer, function 603 reads the byte at the address and sends it to a polynomial function, or CRC check. In an embodiment of the invention constructed, this polynomial division was effected with dedicated hardware, see FIG. 1 and polynomial divider 45. It is within the scope of the invention, however, to perform this polynomial division or CRC signature analysis in software. In any event, function 603 extracts a selected byte from ROM and sends it to the polynomial division function. Function 604 determines if we have completed a predetermined portion of memory, and as long as we have not, we return to function 602 and build up a result in the polynomial divider. Once we have read a predetermined number of bytes, function 605 is performed to determine if the entire memory has been checked. In some cases, the entire memory may be checked on one pass through SIGANL, in other cases, where program memory is too long, it may be checked in pieces, with software registers keeping track of the amount of memory that has already been checked. When all memory is checked, function 606 resets the pointers. Whether or not that is appropriate, thereafter function 607 (see FIG. 6B) reads the remainder in the polynomial divider, or the results of the polynomial division function. Function 608 adds a normalizing constant (from the table) and function 609 is effected. While function 609 appears to be a comparison, actually it is a branch on the remainder. If the branch is correct, then we branch into the main program at function 610 to continue processing. If the remainder is incorrect, then we either end up at a halt or branch to some indeterminate location which will lead to a HALT condition. The quantum of memory checked on each pass of SIGANL is designed to consume an amount of time that would have been consumed by performing function 369, had the flag tested for at function 367 not been set. Accordingly, when SIGANL is processed, two results are produced, first of course ROM is checked for a failure, and secondly we are marking time equivalent to a predetermined number of carrier off cycles.

In general, LOCYCL generates a number of half carrier on and half carrier off cycles which are specified by the contents of the check word, HICYCL generates a single carrier on half cycle and NOCYCL marks time for what corresponds to a carrier off half cycle. HICYCL and NOCYCL determine exit points from the next check word, thus requiring a check word pair for execution (entry, time marking and exit). LOCYCL is entered as determined by a first check word, when entered from EXECHK it reads the next check word to determine the number of carrier on and carrier off cycles. When LOCYCL is entered from TIMCHK, the second word has already been accessed by TIMCHK. If that word had been A7CION, then TIMCHK passes 070A, hex to LOCYCL, corresponding to the necessary cycle count data.

At the end of every modulation cycle which is to be checked. The check word read at EXECHK calls TIMCHK. In this fashion, the duration of each modulation cycle can be checked. Of course, this requires the correct check word. If TIMCHK is not called at the appropriate time, then when TIMCHK is later called the count will be incorrect which will stop the processing via a HALT.

At the end of a recheck time (which may also be the end of the sustain time), the exit from TIMCHK is through CHKWDS and directly through function 327.

Referring now to FIG. 5C, GETCHK is illustrated.

As described in connection with FIG. 5B, GETCHK is entered with a quantity identifying the number of modulation cycles to be generated (CYCNBR) as well as the total number of carrier cycles (CYCTOT) included within that number of modulation cycles. The number of modulation cycles which are authorized CYCNBR is loaded in a first counter and the number of carrier cycles authorized CYCTOT is loaded in a different counter (function 340). Function 341 raises the request check word flag to the primary processor 10.

Function 342 generates a single modulation cycle and decrements CYCNBR (the number of remaining authorized modulation cycles). See, for example, the description of function 366 and 369 relative to FIG. 5G. Function 343 decrements CYCTOT (actually, function 343 is performed after each individual carrier cycle, to decrement CYCTOT). Function 344 tests to see if the check word ready flag has been received. Assuming it has not, function 345 is performed to determine if additional modulation cycles are authorized (this is determined by checking CYCNBR). If additional cycles have been authorized, then function 346 loads the cycle counter from CYCTOT. The loop of functions 342-346 may be continually performed so long as additional modulation cycles are authorized (i.e. CYCNBR has not yet been decremented to zero) and the check word ready flag is not detected. If the number of authorized cycles expires without the check word ready flag being detected, then the loop of functions 344-345 are continually performed until the check word ready flag is detected. Moreover, once the larger loop is no longer performed (because additional modulation cycles are not authorized), the enabling output terminates. This technique provides for further levels of protection. Since the number of carrier cycles (CYCTOT) is related to the number of modulation cycles (CYCNBR—for example CYCTOT at the end of any modulation cycle should be an even integer multiple of CYCNBR) we can test for this relationship, and if the relationship is violated we can force a HALT which will also have the effect of terminating the enabling output.

In either event, when the check word ready flag is detected, then processing skips to NUTIME (see FIG. 5D).

As shown in FIG. 5D, function 350 is performed to test the recheck time. The recheck time is tested with the same technique used to test the modulation cycle, e.g. additional quantities REFERENCE and PRESET are manipulated and one of them is summed with the time quantity read from the timer.

Actually, this is further summed (see function 351) with the next TOKEN. This determines whether a recheck time or the sustain time is concluded. Function 352 branches on the address. There are three possibilities. In the event that a recheck time (but not the sustain time) has terminated, then function 353 is performed. In the event that the sustain time is also terminated, then processing skips to MNWRDS. Any other possibility leads to a halt.

Assuming that a recheck time has expired, then function 353 completes the manipulation of the quantities PRESET and REFERENCE and loads the recheck timer. Function 354 updates the quantities DISPLACEMENT and INCREMENT by their deltas. Thereafter, function 354 directs processing to EXECHK.

This accesses the next recheck check word where the cycle is again repeated.

From the foregoing, a number of characteristics of the invention should be apparent. Firstly, the vital driver 15 has no a priori knowledge of the required form of the enabling output, i.e. it simply responds to the check words received from the primary processor 10. If the check words from the primary processor 10 are configured so as to change the condition of the output bit at the appropriate times, then an output is produced having characteristics as required to produce the enabling signal. However, the same output can be produced at an almost infinite variety of ways, thus allowing a large variation in the number of check words to be accommodated. More particularly, the operating sequence of the vital driver is built up from a number of modules. Some of these modules (HICYCL and NOCYCL), for example, produce a single carrier half cycle on or carrier half cycle off. A sequence of HICYCL and NOCYCL will produce a modulation cycle. This follows from the fact that the various steps of these modules are designed to consume an appropriate amount of time, and by manipulating the output bit at the beginning and the end, the output bit is maintained in the appropriate condition to produce the appearance of a carrier on cycle and a carrier off cycle. Of course, a further constraint is that each module requires a check word. Longer periods of the enabling output can be produced from a single pair of check words using LOCYCL, by specifying the number of carrier on, and carrier off cycles. A further module (TIMCHK) provides for generating still more of the enabling output, while at the same time checking the modulation cycle duration. While TIMCHK, HICYCL, NOCYCL and LOCYCL can be entered from EXECHK and direct processing back to EXECHK, other routines necessary for linking longer durations of the enabling output are required; for example GETCHK and NUTIME. While these modules do not produce significant amounts of the enabling output, they are essential and therefore must be performed. Finally, to link a number of recheck times into a sustain time, other modules (MNWRDS and NUMAIN) are also required. And finally, the start up vital delay is provided by DELAY. The resulting package is modular in nature, but each element of the module must be executed at least once, others must be executed at least once per sustain time, still others must be executed at least once per recheck time, and finally at the lowest level there are a plurality of modules which can be executed a variable number of times so as to build the required enabling output.

It should be apparent from the foregoing, then, that the invention provides a method and apparatus for producing, from check words received on a batch basis, a time sensitive signal (the enabling output) whose parameters (carrier frequency, modulation type and rate and duty cycle) are determined by the number and content of the check words received by the vital driver. Two conditions are necessary for producing the enabling output of the desired form, the first condition is that the check words, by their number and content, are such as to produce from the program, the enabling output, and the second condition is that the vital driver execute its program without fault. In addition, while the foregoing two conditions are sufficient, the vital driver software is flexible enough so that there is more than one set of check words which will produce an identical enabling output. More particularly, because of the modular nature of the program segments in the vital driver software, segments of the enabling output (for example an entire modulation cycle) can be produced by one or many pairs of check words, thus providing significant flexibility to the vital driver to enable it to check operation of primary processes performing significantly different primary functions.

I claim:

1. Processor apparatus, for producing a given signal with time sensitive parameters determined from data passed to said processor on a batch basis wherein said given signal may be produced by widely different data, comprising:
   program means including a plurality of program segments, including first program segments which, when executed by said processor, produce segments of said given signal, and second program segments which, when executed by said processor produce a fixed portion of said signal;
   means responsive to said data for calling corresponding program segments for execution;
   whereby data, having predetermined characteristics, made available to said processor on a batch basis, and at appropriate times, results in execution of a sequence of said program segments so as to produce said given signal with said time sensitive parameters.

2. The apparatus of claim 1 wherein said program means includes in said first program segments:
   LOCYCL means for producing a segment of said given signal of duration determined by data passed to said LOCYCL means.

3. The apparatus of claim 1 wherein said program means includes in said second program segments:
   means for producing a segment of said given signal of fixed duration and of predetermined amplitude.

4. The apparatus of claim 1 in which said program means includes, in said second program segments:
   first and second means for producing, respectively, a given segment of said given signal of respectively different amplitudes.

5. The apparatus of claim 1 wherein said given signal is an amplitude modulated carrier wherein carrier frequency and modulation rate are said time sensitive parameters.

6. The apparatus of claim 1 in which said data comprises plural check words and in which said program segments, when executed by said processor, employs a check word only once, said program segments including means to destroy each such check word.

7. The apparatus of claim 6 in which said program segments include means to modify each check word in a manner which is different than a modification of any other check word.

8. The apparatus of claim 1 in which said processor apparatus includes an independent timer, and said program means includes time checking means to periodically compare a period of said given signal with a period measured by said timer.

9. The apparatus of claim 1 in which said processor apparatus includes a state counter counting clock states of said microprocessor and in which said program means includes state checking means to periodically compare a present state count with a predetermined number.

10. The apparatus of claim 1 wherein said program means includes in said second program segments GETCHK means for conditionally producing a fixed segment of said given signal in the absence of receipt of new data and for skipping to other program segments prior to conclusion of said fixed segment on receipt of new data.

11. The apparatus of claim 1 in which said means responsive to said data includes:
   modification means for modifying a received check word to produce a modified check word, and
   branch means to branch to an address derived from said modified check word,
   whereby if said modified check word is not an expected value, said branch is to an incorrect location.

12. The apparatus of claim 11 in which both said first and second program segments include:
   modification means for modifying a received check word to produce a modified check word, and
   branch means to branch to an address derived from said modified check word,
   whereby if said modified check word is not an expected value, said branch is to an incorrect location.

13. The apparatus of claim 5 in which no single program segment can produce a portion of said time sensitive signal equivalent to a cycle of said modulation rate.

14. The apparatus of claim 1 in which at least one of said program segments includes:
   means for testing program memory contents to produce a result,
   and means responsive to said result for branching to a program address related to said result,
   whereby an unexpected result prevents proper program execution.

15. The apparatus of claim 1 in which said program means include:
   an initialization sequence which, when executed, provides a vital starting delay.

16. The apparatus of claim 1 further including:
   driver means responsive to said given signal to generate an enabling signal in response to said given signal or no enabling signal if parameters of said given signal are outside predetermined values, said dirver means having vital characteristics.

17. Apparatus responsive to a sequence of groups of main and recheck words to produce a specified output if and only if said groups of main and recheck words form an acceptable set, comprising:
   means responsive to a group of main check words for determining a sustain time during which said specified output may be produced;
   means responsive to a group of recheck words for producing said specified output for a recheck time determined by said recheck words but only if said recheck time, summed with all prior recheck times, produced subsequent to said initiation of the last sustain time is less than said sustain time,
   whereby a time sequence of said particular outputs, consisting of an amplitude modulated carrier wherein said carrier frequency and said modulation rate are specified, forms said specified output.

18. The apparatus of claim 17 in which said means responsive to a group of main check words includes:

means to modify each check word in a manner different from modification of any other check word.

19. The apparatus of claim 17 in which said means responsive to a group of main check words includes:
   means to destroy each check word.

20. The apparatus of claim 17 in which said means responsive to a group of recheck words includes:
   means to modify each recheck word in a manner different from modification of any other recheck word.

21. The apparatus of claim 17 in which said means responsive to a group of recheck words includes:
   means to destroy each recheck word.

22. The apparatus of claim 17 in which said means responsive to a group of recheck words includes a plurality of program segments, each for producing a portion of said specified output during execution of said program segment, each of said program segments including means responsive to a recheck word for calling another program segment.

23. The apparatus of claim 22 in which each of said program segments includes means for modifying a recheck word and for branching to a program address derived from said check word.

24. The apparatus of claim 23 in which each of said program segments includes means to destroy a recheck word as a recheck word is modified.

* * * * *